Nov. 8, 1949 W. G. CARTTER 2,487,775
FLUID FUEL BURNING SPACE HEATER
Filed Aug. 15, 1944 8 Sheets-Sheet 1

INVENTOR.
WILLIAM G. CARTTER.
BY
ATTORNEY.

Nov. 8, 1949  W. G. CARTTER  2,487,775
FLUID FUEL BURNING SPACE HEATER
Filed Aug. 15, 1944  8 Sheets-Sheet 2

INVENTOR.
WILLIAM G. CARTTER.
BY
ATTORNEY.

Nov. 8, 1949 W. G. CARTTER 2,487,775
FLUID FUEL BURNING SPACE HEATER
Filed Aug. 15, 1944 8 Sheets-Sheet 3

INVENTOR.
WILLIAM G. CARTTER.
BY
ATTORNEY.

Nov. 8, 1949 W. G. CARTTER 2,487,775
FLUID FUEL BURNING SPACE HEATER
Filed Aug. 15, 1944 8 Sheets-Sheet 5

INVENTOR.
WILLIAM G. CARTTER.
BY
ATTORNEY.

Nov. 8, 1949 — W. G. CARTTER — 2,487,775
FLUID FUEL BURNING SPACE HEATER
Filed Aug. 15, 1944 — 8 Sheets-Sheet 7

INVENTOR.
WILLIAM G. CARTTER.
BY
ATTORNEY.

Patented Nov. 8, 1949

2,487,775

UNITED STATES PATENT OFFICE 2,487,775

FLUID FUEL BURNING SPACE HEATER

William G. Cartter, Monrovia, Calif.

Application August 15, 1944, Serial No. 549,542

11 Claims. (Cl. 126—91)

This invention relates to fluid fuel burning space heaters, and particularly to a vented heater for installation in the wall of a room.

An object of the invention in its simplest, single unit form, is to provide a vertical type vented gas unit heater delivering heat primarily by radiation and secondarily by convection, mountable within a building wall and without any substantial protrusion into the room, of relatively inexpensive construction, and economical in operation.

A more particular object is to provide a body height heater of the character described whereby heat will radiate and be reflected throughout the strata where heat is most required, and whereby venting requirements are also reduced by reason of the construction, location and height of the heater.

Another object is to provide a high safety factor in a heater of the character described wherein open flame is avoided, and downdraft conditions are provided for.

A further, very important object of the invention in its modified, multiple unit, form, is to provide dual, selective heating by a heater of the character described, for adjacent rooms, through employment of a back-to-back heater construction installable in a common cut or space in the wall separating the rooms. This may be accomplished by identical heating elements, or by a single element on one side for a small room, and twin elements (or more) on the other side for a large room. Other modifications may embody a plurality of elements on both sides, or twin elements in a single side type.

A still further object, in the multiple unit form, is to provide a common vent for the multiple heating elements but with independent downdraft controls, and independent heat controls, but utilizing a single gas supply.

Another object of the invention is to provide a space heater construction employing a special form of heating element comprising an elongated tube with a central partition, the tube having indentations which cooperate with the partition to restrict the passage of products of combustion rising through the tube, thereby capturing the heat more effectively and radiating a high percentage of the heat generated which otherwise would escape through the vent.

Another object is the provision of a vented type heater adapted to fill a cut in a wall between two rooms and supply heat selectively to either room, employing either gas or other fluid fuel consuming heating elements.

These, and other objects of the invention, will become further apparent from the drawings and the following description.

In the drawings:

Figure 10 is a perspective showing the downdraft and reflector assembly of the heater.

Figure 12 is a vertical section through this modified form of heater, which embodies a back-to-back single unit construction. This view is taken along the line 12—12 of Figure 11.

Figure 13 is a cross sectional view near the top of this modified form of the invention embodying the back-to-back single unit construction, taken on the line 13—13 of Figure 12.

The invention is thus illustrated in several forms as follows:

*Form A.*—Single gas heating element, single side—Figures 1 to 10.

*Form B.*—Single gas heating element, back-to-back—Figures 11 to 15.

*Form C.*—Twin gas heating elements, single-side—Figures 16, 17, 20 and 21.

Figure 18:
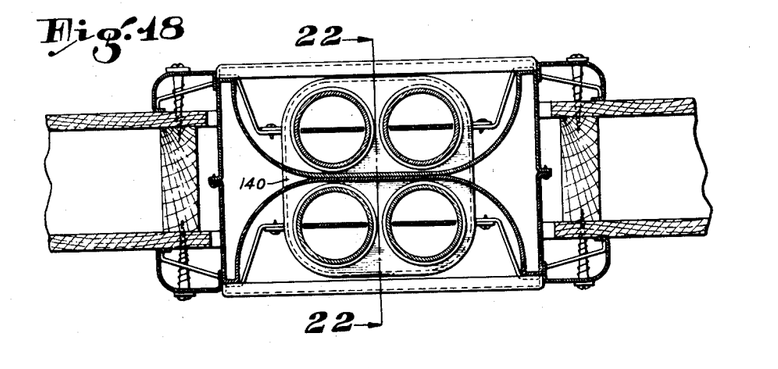
Figure 18 is a similar cross sectional view of another modification of the heater which comprises twin heating elements in a back-to-back construction.
Figures 20, 21, 23:
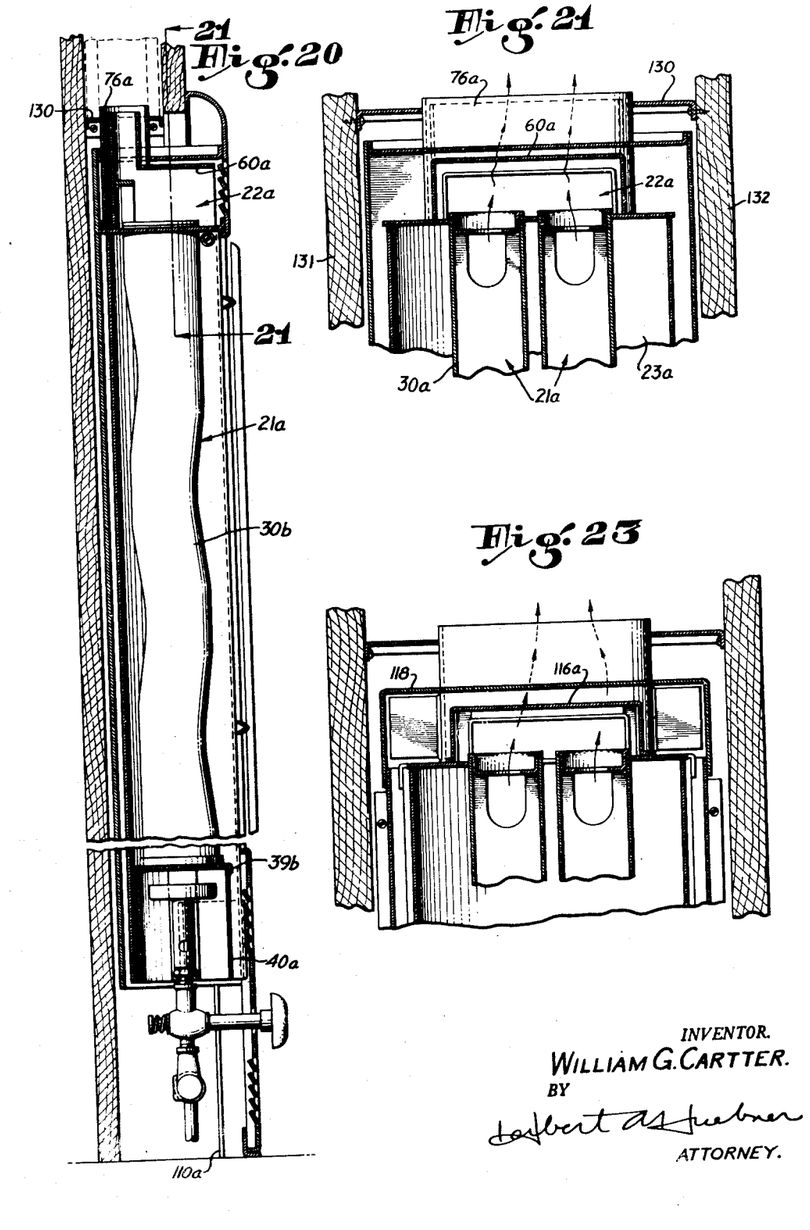
Figure 20 is a vertical section of the form shown in Figure 17, taken on the line 17—17 of that figure.
Figure 21 is a vertical enlarged fragmentary section taken on the line 21—21 of Figure 20.
Figure 23 is a vertical enlarged fragmentary section taken on the line 23—23 of Figure 22.
Figure 22:
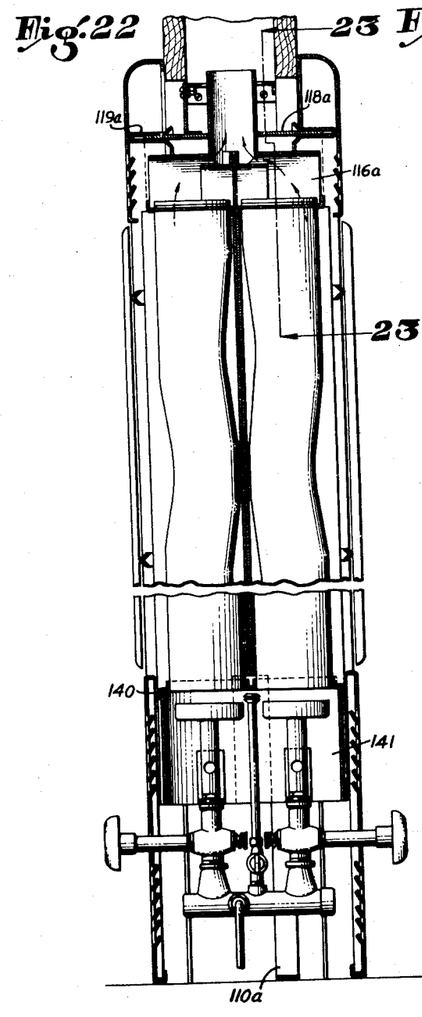
Figure 22 is a vertical section of the form shown in Figure 18, taken on the line 22—22 of that figure.

*Form D.*—Twin gas heating elements, back-to-back—Figures 18, 22 and 23.

*Form. E.*—Twin gas heating elements one side, single heating element other side, back-to-back—Figures 19 and 24.

*Form A.—Single gas heating element, single side*

Referring to Figures 1 to 10, the simple form of heater 20 there illustrated comprises a heating element 21, a vent and down-draft assembly 22, a reflector 23, a protective rough-in box 24, and a front assembly 25.

The heating element 21 comprises an elongated generally straight tube 30 deformed by spaced and oppositely staggered indentations 31. The upper end supports an annular flanged cap 33 which has a circular opening 34 located eccentrically as shown. Depending from this cap 33 is a straight partition or baffle 35 formed with an opening 36 at the upper end where it joins the cap. The partition preferably extends substantially from wall to wall of the tube 30 across the unbroken diameter thereof and extends down to a point adjacent the lower end of the tube. The indentations 31 are struck in toward the opposite plane surfaces of the partition, in combination therewith providing restricted passages 37 alternating with expansion chambers 38. The plane of the baffle is transverse of the heater (see Figure 7) and the indentations of the tube are consequently located at the front and back of the heating element as installed. A heating element of this type is disclosed and claimed in my U. S. Patent No. 1,991,788.

The lower end of the tube is encircled by a flanged base member 39 which rests upon an open bottom burner housing 40. The burner housing encloses a gas burner 41, receiving its supply of gas from a source 42 through a valve 43. Air joins the gas through a port 44, and additional air rises through the open bottom of the housing. The gas is lighted by a pilot 45, preferably of an automatic type which turns off the gas supply if the pilot flame should become extinguished. Such pilot devices are well known in the art.

Figure 1:
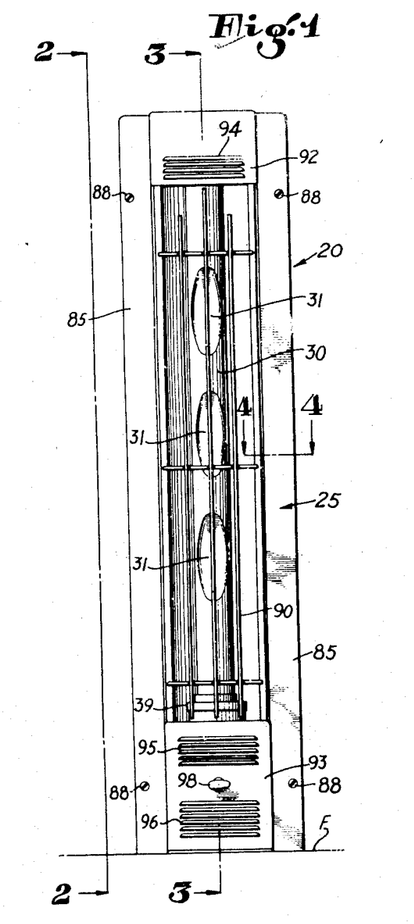
Figure 1 is a front elevation of my single unit heater installed in a wall.
Figure 2:
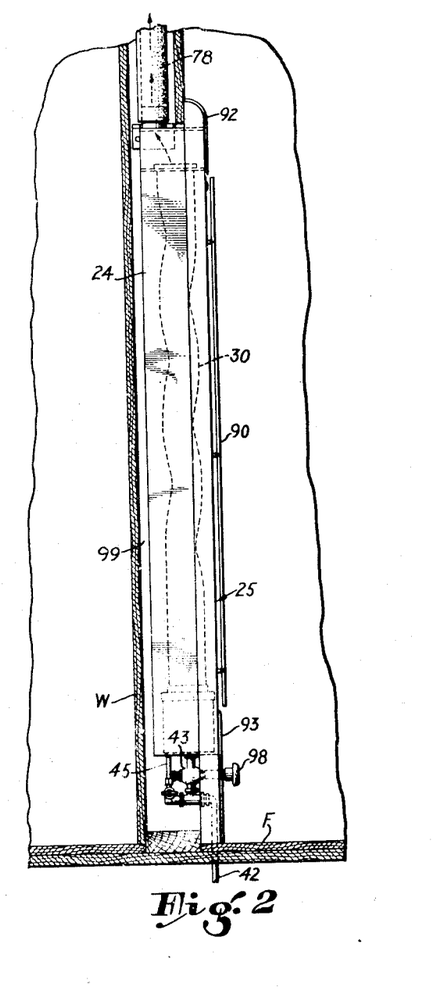
Figure 2 is a section taken through the wall on line 2—2 of Figure 1 and showing the heater in side elevation.
Figures 3, 5, 6, 7:
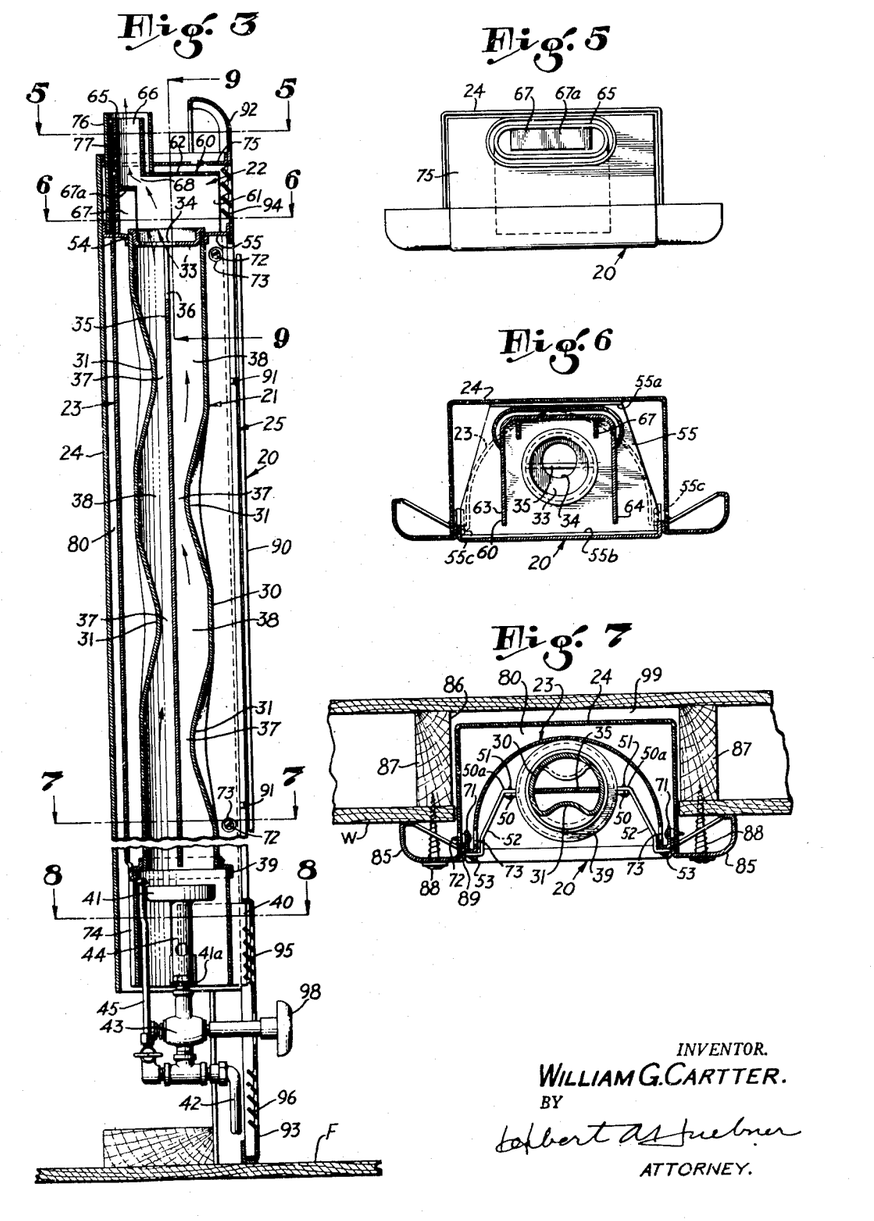
Figure 3 is a vertical section through the heater taken on the line 3—3 of Figure 1.
Figure 5 is a horizontal section taken on the line 5—5 of Figure 3.
Figure 6 is a horizontal section taken on the line 6—6 of Figure 3.
Figure 7 is a horizontal section taken on the line 7—7 of Figure 3.
Figure 4:
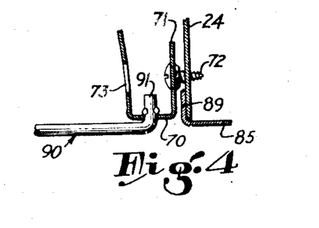
Figure 4 is a fragmentary section taken on the line 4—4 of Figure 1.
Figures 8, 9, 11, 16:
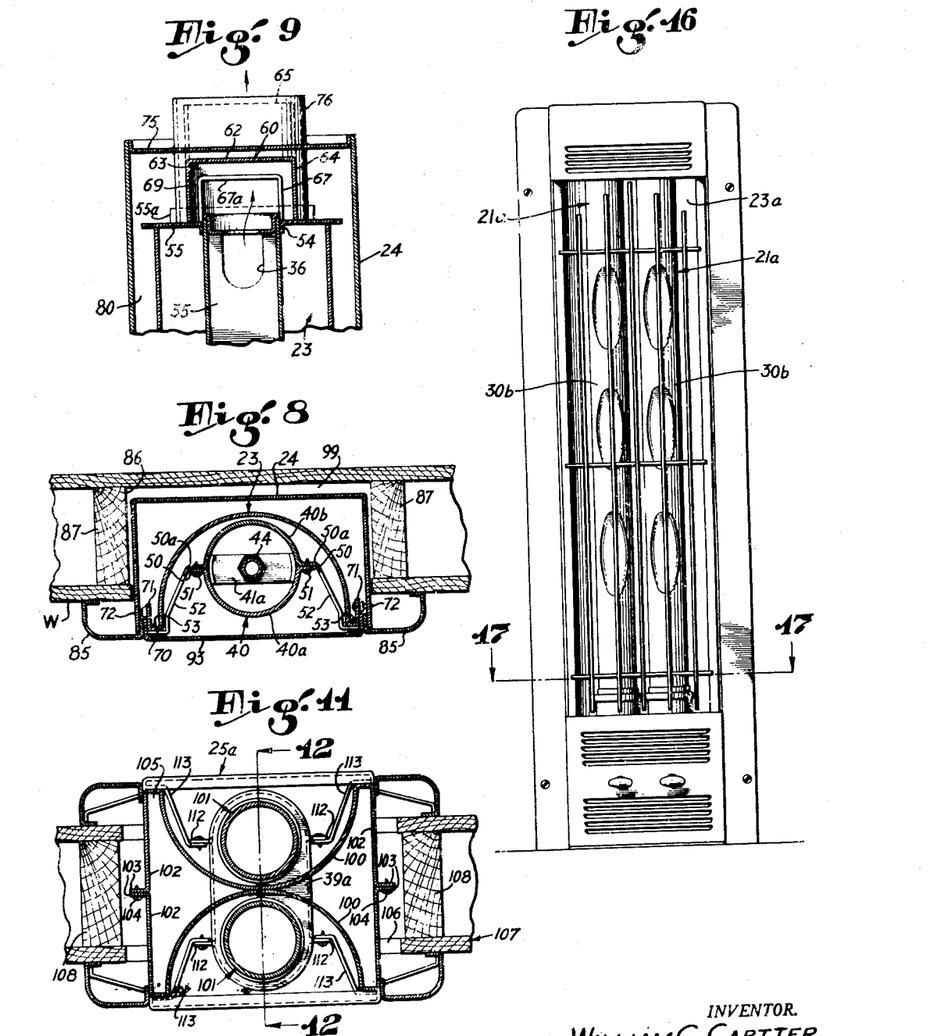
Figure 8 is a horizontal section taken on the line 8—8 of Figure 3.
Figure 9 is a fragmentary vertical sectional detail taken on the line 9—9 of Figure 3.
Figure 11 is a horizontal cross section of a modified form of heater taken on the line 11—11 of Figure 12.
Figure 16 is a front elevation of another modified form of the invention embodying twin heating elements.
Figure 14:
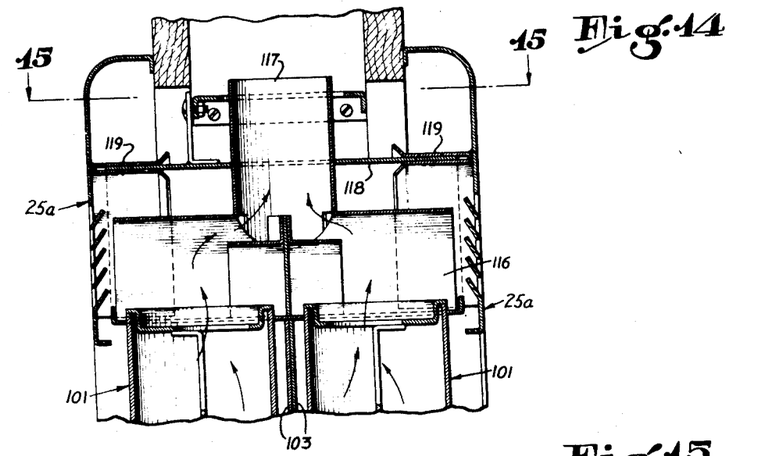
Figure 14 is an enlarged vertical sectional fragmentary view of the form shown in Figure 12 and taken along the line 14—14 of Figure 15.
Figure 15:
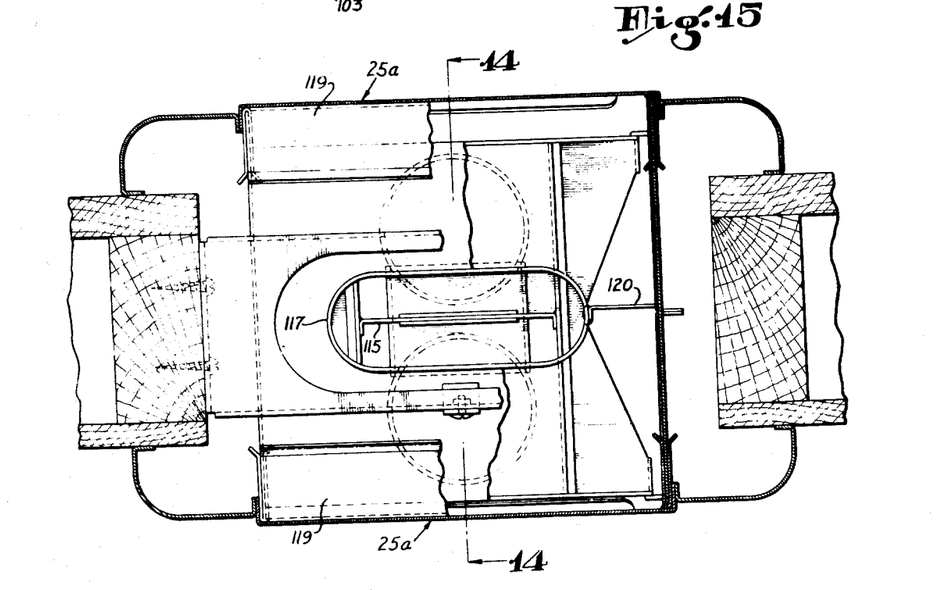
Figure 15 is a horizontal section taken on the line 15—15 of Figure 14.
Figure 17:
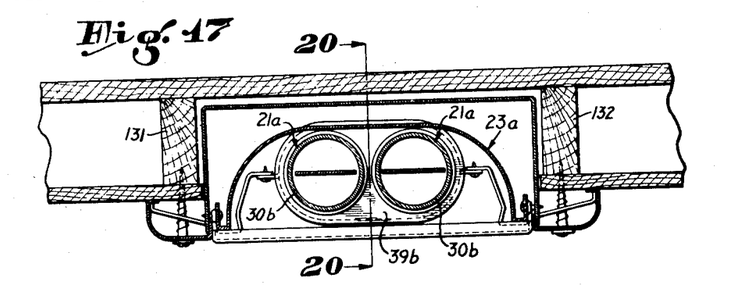
Figure 17 is a cross sectional view near the base of the heater shown in Figure 16, taken on the line 17—17 of that figure.

Referring to Figures 7 and 8, the burner housing employed for illustration comprises cooperating semi-cylindrical shells 40a and 40b, with complementary ears 50 and 50a attached by screws 51. The ears 50a are extended to form brackets 52, which are mounted on the reflector 23 by screws 53. A U shaped burner supporting bracket 41a is welded to the shell 40b.

Referring to Figures 3, 6, 9 and 10 the upper end of the heating element is retained in a confining opening 54 of a shelf 55 closing off the upper end of the reflector 23 and the box 24 at that point. The shelf has flanges 55a and 55b for locating purposes, the flange 55a being preferably welded to the rough-in box 24. The shelf also has depending ears 55c which are welded to the reflector.

Referring principally to the same figure, the vent and downdraft assembly 22 comprises a collector box 60 open at the front 61, closed at top 62, sides 63 and 64. This box seats upon the shelf 55. The back is part of a sleeve elements 65 whereby a short outlet collar 66 is formed for discharge of products of combustion. The front to rear dimension of the outlet collar 66 is less than that of the collector box whereby the outlet collar may lie entirely within the house wall structure and the front of the collector box extends forward from the front of the outlet collar.

Positioned below the lower end of the outlet 66 is a draft hood in the form of an inverted U member 67, adjoining the back 64, resting on the shelf 55, and open at the front. The horizontal portion or baffle 67a of the draft hood extends into the area defined by the outlet 66 and is spaced downwardly therefrom, leaving a restricted passage 68 for the products of combustion. The passage 68 is of less cross sectional area than the outlet 66, and tends to choke off a downdraft, and to divert whatever downdraft may enter the box 60 horizontally outward through the open end of the box into the room.

The reflector 23 as illustrated is a substantially semi-cylindrical shell approximately the same length as the heating element, its upper end abutting the shelf 55, and its lower end terminating approximately at the lower end of the burner housing 40. It is formed with vertical edge supporting sections comprising facings 70 provided by bending the edges transversely and then back as shown at 71 in Figures 8 and 10. Screws 72 may be used through these flanges 71 to secure the reflector to the rough-in box 24. Holes 73 in the reflector permit introduction of the screws. The reflector is placed so that it is spaced away from the heating element 21 except that a cut away 74 may be provided to accommodate the rear portion of the burner housing 40. The tube 30 of the heating element is preferably although not necessarily entirely within the concavity of the reflector. The reflector is preferably, though not necessarily, a metal with a relatively bright natural or applied surface.

The rough-in box 24 is a housing of metal or other fire and heat resistant material, most suitably of rectangular cross section but open at the front. It extends from just below the lower end of the reflector to a point above the top 62 of the collector box 60. The shelf 55 engages its walls and it is provided with a top closure 75.

An element which may be considered a part of the rough-in box 24 is a false flue or stack 76 which surrounds the outlet 66 but is spaced therefrom, and extends through the top closure 75. This arrangement provides an air space 77 which tends to insulate the building structure in the vicinity of the vent and downdraft assembly from heat present in the latter. Any suitable asbestos cement or other conduit 78 may be coupled to the outlet collar 66 or stack 76 or both for conducting products of combustion through the building wall for discharge exteriorly of the building.

The rough-in box 24 is assembled with the reflector and heating element so that an air space 80 is provided between the sides and back of the box and the reflector.

The front assembly 25 includes decorative and supporting side moldings 85 which may be permanently assembled with the rough-in box 24 and detachably assembled with the reflector 23 and which affords a finished appearance to the heater, concealing edges of the wall opening 86 in which the heater is installed, and also enables mounting of the heater by means of screws 88 driven into the studding 87 of the wall W. These moldings extend to the floor F and function as frame supports for the assembled heater elements. The moldings 85 may be formed with turned in flanges 89 against which the flanges 71 of the reflector may be drawn by the screws 72. Thus, the combined rough-in box 24 and side moldings 85 may be first installed, the reflector 23 with the vent and downdraft elements then attached, and the heating element then installed. This is by way of illustration and not of limitation.

This front assembly 25 also includes a grill 90 which may be detachably hung on the facings 70 of the reflector by pins 91 pushed therethrough. A louvered head plate 92 closes the upper front end of the heater between the side moldings 85, and a louvered bottom plate 93 closes the lower front end. The louvers 94 in the head plate open adjacent the open end of the box 60. The lower plate has two sets of louvers 95 and 96, the upper louvers 95 primarily supplying air from the room to ascend around the heating element, and the louvers 96 supplying air to the burner proper.

The valve control 98 is located outside the bottom plate 93.

The operation is as follows: Assuming the pilot is burning, the valve 43 is opened and the main burner lighted. Products of combustion ascend through the tube 30 on both sides of the partition, following an interrupted course presented by the indentations 31. The restricted passages 31 delay ascension and cause the hot gases to impinge upon the walls of the tube with more direct application and for a much longer period than if passing through a true cylindrical pipe. The results are proven by test to be far superior to the use of undeformed pipe, and the heat is uniformly distributed over the length of the tube. Heat radiates from the external surface of the tube. As this radiated heat travels in straight lines, some goes directly into the room, while much of it is caught by the reflector and directed horizontally fanwise into the room. Little of the heat travels vertically, the result being that a body height stratum is efficiently heated by radiated heat, which is the most effective and most economical. Heat by convection is delivered by air rising adjacent the heating element and being forced outwardly by accumulation within the reflector.

The products of combustion enter the collector box 60 and normally travel through the passage 68 into the outlet 66 and thence into the vent pipe 78.

Under downdraft conditions, the baffle 67a will tend to divert downdraft air, and gases, outwardly through the open front end of the box 60 into the room, by-passing the opening 34 in the cap 33 of the tube 30 and preventing extinguishment of the burner flame. When the downdraft condition ceases, the normal discharge of products of combustion is resumed.

The wall of the building is adequately heat insulated by the spaced elements of the rough-in box and reflector. The heater occupies very little space in the room, and aside from this offers marked advantages over recessed heaters known to the art. Floor furnaces, for example, are dirt catchers, often go out of commission by water seepage, are difficult of access to operate or repair, and are inefficient heaters. Unvented heaters embodying radiant mantles frequently discharge objectionable, if not actually noxious, gases into the room due to incomplete combustion, a condition sometimes aggravated when the heat is turned low. My present heater suffers none of these criticisms. It operates with the flame confined, is completely vented, discharges a remarkable amount of radiant heat, and is easily installed as well as readily accessible for servicing. It is the first space heater, to my knowledge, employing a vertical flue tube as a heating element, and the construction of the tube, in conjunction with the reflector, results in a vented space heater with directional characteristics, operating quietly, with safety, and conserving room space.

This form of heater is for installation in a wall recess 99 (see Figure 2), and is sufficiently shallow in depth that an air space may be left between the rough-in box and the opposite wall, even in standard minimum thickness wall construction.

While various methods of fabrication may be employed, I have found it particularly advantageous to construct the reflector and the vent and downdraft assembly parts in a unit as illustrated in Figure 10. These may be made of sheet metal readily cut, formed, and welded.

*Form B.—Single gas heating element back to back*

A modified form of my invention previously referred to and illustrated in Figures 11 to 15, is the multiple type providing dual selective heating for adjacent rooms through employment of a back to back heater construction installable in a complete cut or space in the wall separating the rooms. As shown in Figures 11 to 15, such a heater may comprise reflectors 100 having the same general contour as previously described and illustrated, with which are associated heating elements 101 of the same type as shown and described in form A of the invention. The protective box of the first form of the invention may be omitted in this modification, as there is no need for such a protective box between the back to back units, and the reflectors themselves may embody side walls 102 which are formed by extending the turned back flanges 71 of the reflector form illustrated in Figure 7. These side walls 102 are provided with outwardly turned flanges 103 which may be secured together by screws 104 thus creating in effect a protective housing for the sides of the heater, as an air space 105 is thus provided between the backs of the reflectors per se and the reflector side walls 102. The backs of the reflectors are contiguous but not necessarily touching.

In this form of heater, instead of supporting the heating elements on the side molding, a foot 110 may be employed, which directly supports the burner housing 111. The burner housing is preferably elongated with an oval horizontal cross section (see Figures 11 and 12) being formed with ears 112 for screw attachment to brackets 113, and covered by a flanged oblong plate 39a.

This form of heater will be mounted in an opening 106 of a wall 107, between studding 108.

The downdraft and vent assembly is modified to provide a common assembly for both heating elements. Twin draft hoods 114 separated by a vertical partition 115 extend respectively into collector boxes 116, both of which latter communicate with a single flue or outlet collar 117 through restricted passages similar to the passage 68 of Figure 3.

The collector boxes rest on a shelf 55a. Enclosing the boxes at sides and top and spaced from the boxes is a housing 118 which replaces the top closure 75 of Figure 9. This housing slips into a slotted retaining member 119 welded to the front assembly 25a, which provides freedom for adjustability between walls of varying thickness and at the same time seals off the wall above the heater against escape of the products of combustion into the wall.

Any visibility between rooms through the louvers 61a which otherwise might be possible, is destroyed by shields 120, which may be continuations of the partition 115.

Form C.—twin gas heating elements single side

The form of twin unit single side heater illustrated in Figures 16, 17, 20 and 21 is similar in all essential respects to the simple form of heater shown in Figures 1 to 10, except that the reflector 23a is extended to accommodate the twin heating elements 21a, and these twin heating elements discharge the products of combustion into a common collector box 60a which is a part of a downdraft assembly 22a similar to that of the first form of the invention but extended in width to accommodate both of the heating elements.

In this modified form, a brace 130 may be fastened to studding 131 and 132 as a support for the stack 76a. At the lower end, the burner housing 40a is closed at the top by a flanged plate 39b providing a spacing webb for the twin tubes 30b.

Form D.—twin gas heating elements, back-to-back

This form of the invention is shown in Figures 18, 22 and 23, and is an adaption of Form B. Figure 11, Form B, corresponds to Figure 18, Form D. In the latter, a flanged substantially rectangular plate 140 spaces the tubes at the top of the burner housing 141.

The housing may be supported by a floor bracket 110a.

The collector box 116a and downdraft assembly, housing 118a, slotted retaining member 119a, and visibility shields are similar to those of Form B, but enlarged to correspond to double heating elements on both sides.

Form E.—twin gas heating elements one side, single heating element other side, back-to-back.

Figure 19:
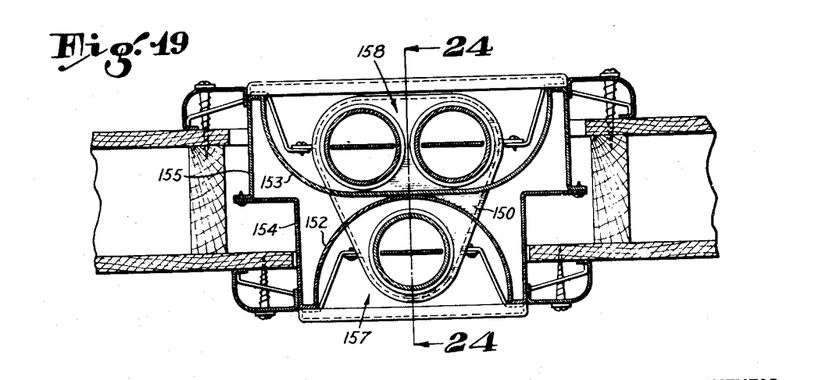
Figure 19 is a similar cross sectional view of another modification of the heater which comprises twin heating elements on one side and a single heating element on the other side in a back-to-back construction.
Figure 24:
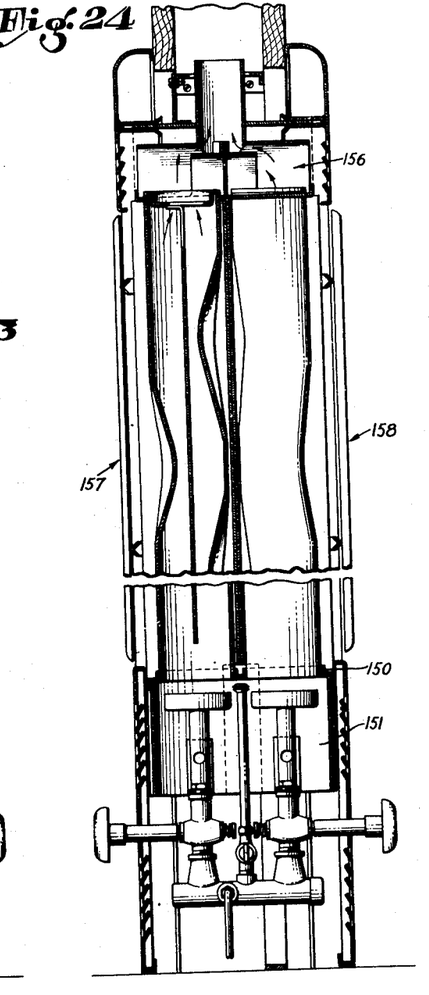
Figure 24 is a vertical section along line 24—24 of Figure 19.

This form is shown in Figures 19 and 24, and employs a substantially triangular flanged plate 150 at the top of the burner housing 151 for spacing the tubes. One reflector 152 is narrow and the other reflector 153 is wide, and their extending flanged members 154 and 155 respectively are designed to be joined as illustrated in Figure 19. The downdraft and vent assembly 156 is a combination of that in Forms B and D; thus the single tube side 157 corresponds to one side of the form shown in Figures 12, 13, and 14, and the double side 158 corresponds to one side of the form shown in Figures 22 and 23, the difference in the two sides of the downdraft and vent assembly being primarily one of width, and the opposite elements being joined into a single vent.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A fluid fuel burning space heater of the radiation type adapted to installation in a room wall comprising a substantially semi-tubular reflector having parallel vertical forward edges forming a heat radiation opening, means for mounting said reflector in a wall recess, a vertically disposed heating tube mounted in said reflector, means forming a burner chamber at the lower end region of said reflector and in communication with said heating tube, a fuel burner positioned in said chamber below said tube to discharge its products of combustion into said tube, a horizontal shelf closing off the upper end portion of the reflector and having an aperture receiving the upper end of the heating tube, side and rear walls and a top structurally associated with said shelf forming a collector box closed on three sides and open at the front only for downdraft or stack relief, an outlet collar for products of combustion extending upwardly from the top of the collector box at the rearward portion thereof, and a downdraft baffle extending forwardly from the rear wall of said collector box directly below said collar and at a level above the upper end of the heating tube.

2. A fluid fuel burning space heater of the radiation type adapted to installation in a room wall comprising a substantially semi-tubular reflector having parallel vertical forward edges forming a heat radiation opening, means for mounting said reflector in a wall recess, a vertically disposed heating tube mounted in said reflector, means forming a burner chamber at the lower end region of said reflector and in communication with said heating tube, a fuel burner positioned in said chamber below said tube to discharge its products of combustion into said tube, a horizontal shelf closing off the upper end portion of the reflector and having an aperture receiving the upper end of the heating tube, side and rear walls and a top structurally associated with said shelf forming a collector box closed on three sides and open at the front only for downdraft or stack relief, the forward edges of the side walls and top of said collector box which form the opening being in a vertical plane approximately co-extensive with the plane of the forward vertical edges of the reflector, an outlet collar for products of combustion extending upwardly from the top of the collector box at the rearward portion thereof, and a downdraft baffle mounted directly below said collar and at a level above the upper end of the heating tube.

3. A fluid fuel burning space heater of the radiation type adapted to installation in a room wall comprising a substantially semi-tubular reflector having parallel vertical forward edges forming a heat radiation opening, means for mounting said reflector in a wall recess, a vertically disposed heating tube mounted in said reflector, means forming a burner chamber at the lower end region of said reflector and in communication with said heating tube, a fuel burner positioned in said chamber below said tube to discharge its products of combustion into said tube, a horizontal shelf closing off the upper end portion of the reflector and having an aperture receiving the upper end of the heating tube, side and rear walls and a top structurally associated with said shelf forming a collector box closed on three sides and open at the front only for downdraft or stack relief, an outlet collar for products of combustion extending upwardly from the top of the collector box at the rearward portion thereof, and a downdraft baffle extending forwardly from the rear wall of said collector box directly below said collar and at a level above the upper end of the heating tube and terminating at a vertical plane approximately in alignment with the rear surface of the heating tube.

4. A fluid fuel burning space heater of the radiation type adapted to installation in a room wall comprising a substantially semi-tubular reflector having a vertically elongated heat radiation opening, means for mounting said reflector in a wall recess, a vertically disposed heating tube mounted in said reflector, means forming a burner chamber at the lower end region of said reflector, said burner chamber being substantially closed on all sides but open at the bottom and in communication at the top with said heating tube, a fuel burner positioned in said chamber below said tube to discharge its products of combustion into said tube, a horizontal shelf closing off the upper end portion of the reflector and having an aperture receiving the upper end of the heating tube, side and rear walls and a top structurally associated with said shelf forming a collector box closed on three sides and open at the front only for downdraft or stack relief, an outlet collar for products of combustion extending upwardly from the top of the collector box axially offset rearwardly from said tube, and a downdraft baffle extending forwardly from the rear wall of said collector box directly below said collar and at a level above the upper end of the heating tube, the rear extremity of the reflector and the rear wall of the collector box being in approximately vertical alignment.

5. A fluid fuel burning space heater of the radiation type adapted to installation in a room wall comprising a substantially semi-tubular reflector having a vertically elongated heat radiation opening, means for mounting said reflector in a wall recess, said means including a rough-in box, a vertically disposed heating tube mounted in said reflector, means forming a burner chamber at the lower end region of said reflector and in communication with said heating tube, a fuel burner positioned in said chamber below said tube to discharge its products of combustion into said tube, a horizontal shelf closing off the upper end portion of the reflector and having an aperture receiving the upper end of the heating tube, side and rear walls spaced inwardly from the rough-in box and a top structurally associated with said shelf forming a collector box closed on three sides and open at the front only for downdraft or stack relief, and an outlet collar for products of combustion extending upwardly from the top of the collector box at the rearward portion thereof and having a front to rear dimension less than that of the collector box whereby the outlet collar may lie entirely within a conventional house wall structure and the front of the collector box extends forward from the front of the outlet collar, said outlet collar being adapted for connection with a wall vent.

6. A fluid fuel burning space heater of the radiation type adapted to installation in a room wall comprising a substantially semi-tubular reflector having a vertically elongated heat radiation opening, means for mounting said reflector in a wall recess, said means including a rough-in box, a vertically disposed heating tube mounted in said reflector, means forming a burner chamber at the lower end region of said reflector and in communication with said heating tube, a fuel burner positioned in said chamber below said tube to discharge its products of combustion into said tube, a horizontal shelf closing off the upper end portion of the reflector and having an aperture receiving the upper end of the heating tube, walls and a top structurally associated with said shelf forming a collector box closed on three sides and open at the front only for downdraft or stack relief, and an outlet collar for products of combustion extending upwardly from the top of the collector box, the rearmost portion of the reflector and of the collector box and outlet collar lying in approximately the same vertical plane, the front opening of the collector box and the heat radiation opening of the reflector lying in approximately the same vertical plane and substantially forward from the front portion of the outlet collar.

7. A fuel burning vented space heater of the radiation type adapted to installation in a room wall comprising a partially restricted vertically disposed heating tube, a fuel burner below and in proximity to said tube to discharge substantially all its products of combustion into said tube whereby the latter is heated, a concave straight vertical edged reflector disposed partially around and parallel to the heating tube and with an opening in a plane across its vertical edges, a horizontal shelf closing off the upper end portion of the reflector and having an aperture receiving the upper end of the heating tube, walls and a top associated with said shelf forming a collector box open in the same direction as the opening of the reflector, a vertical outlet for products of combustion offset rearwardly from the upper end of the heating tube and in communication with the collector box, and a baffle in the collector box directly below said outlet and spaced above and to the rear of the upper end of the heating tube for directing any downdraft outwardly through the open end of said collector box.

8. A space heater adapted for installation in an opening formed through a building wall comprising vertically elongated concave reflectors arranged back to back, side wall members extending across from a vertical line adjacent the forward corresponding edges respectively of said reflectors and connected to said reflectors serving to protect adjacent building wall structure from heat emitted from the backs of said reflectors, each of said reflectors forming the vertical confining and reflecting element of a heating chamber, an upper shelf near the upper end of each reflector forming the top of the heating chamber, means forming a burner chamber at the lower end region of each reflector, fuel consuming burners in said burner chambers, a superstructure including walls and top overlying said reflectors and mounted in operative association therewith and in cooperation with said upper shelves forming gas collecting means lying wholly within the vertical planes of the forward edges of the reflectors, a hollow heating element in each said heating chamber communicating between said burners and said collecting means and adapted to carry products of combustion from said burners to said collecting means and to be heated thereby, and a single outlet collar communicating with said gas collecting means and adapted to carry off the products of combustion from said gas collecting means to a vent.

9. A space heater adapted for installation in an opening formed through a building wall comprising vertically elongated concave reflectors arranged back to back and formed with lateral edge flanges, inwardly extending side wall members joined to said flanges and spaced from the reflectors thereby, the side wall members on each side being secured together and forming continuous shields serving to protect adjacent building wall structure from heat emitted from the backs of said reflectors, each of said reflectors forming the vertical confining and reflecting element of a heating chamber, an upper shelf near the upper end of each reflector forming the top of the heating chamber, means forming a burner chamber at the lower end region of each reflector, fuel consuming burners in said burner chambers, a superstructure including walls and top overlying said reflectors and mounted in operative association therewith and in cooperation with said upper shelves forming gas collecting means, a hollow heating element in each said heating chamber communicating between said burners and said collecting means and adapted to carry products of combustion from said burners to said collecting means and to be heated thereby, and a single outlet collar communicating with said gas collecting means and adapted to carry off the products of combustion from said gas collecting means to a vent.

10. A space heater adapted for installation in an opening formed through a building wall comprising vertically elongated concave reflectors arranged contiguously back to back, side wall members structurally associated with said reflectors uniting said reflectors as a dual unit for installation in the building wall the side wall members serving to protect adjacent building wall structure from heat emitted from the backs of said reflectors, each of said reflectors forming the vertical confining and reflecting element of a heating chamber, means forming a burner chamber at the lower end region of each reflector, fuel consuming burners in said burner chambers, gas collecting means overlying said reflectors, a hollow heating element in said heating chamber communicating between said burners and said collecting means and adapted to carry products of combustion from said burners to said collecting means and to be heated thereby, and a single outlet collar communicating with said gas collecting means and adapted to carry off the products of combustion from said gas collecting means to a vent.

11. A space heater comprising vertically elongated concave reflectors united in contiguous back to back arrangement and adapted for installation in a building wall opening, each of said reflectors forming the vertical confining and reflecting element of a heating chamber, means forming a burner chamber at the lower end region of the reflectors, a gas consuming burner in the burner chamber below each heating chamber, a common gas supply for all said burners, individual controls for the burners, gas collecting means overlying said reflectors, shielding means structurally associated with said gas collecting means centrally thereof and in combination therewith blocking visibility through the heater above the reflectors, a hollow heating element in each said heating chamber communicating between said burner and said collecting means and adapted to carry products of combustion from said burner to said collecting means and to be heated thereby, and a single wall vent means communicating with said gas collecting means adapted to carry off products of combustion to the outside atmosphere.

WILLIAM G. CARTTER.

REFERENCES CITED

The following references are of record in the file of this patent:

UNITED STATES PATENTS

| Number | Name | Date |
|---|---|---|
| 1,064,258 | Sharpe | June 10, 1913 |
| 1,147,916 | Bailey | July 27, 1915 |
| 1,196,019 | Palmer | Aug. 29, 1916 |
| 1,216,848 | Schmidt | Feb. 20, 1917 |
| 1,652,268 | Benjamin | Dec. 13, 1927 |
| 1,655,211 | Terry | Jan. 3, 1928 |
| 1,660,688 | Terry | Feb. 28, 1928 |
| 1,695,079 | Barnhart | Dec. 11, 1928 |
| 1,757,905 | Guenther | May 6, 1930 |
| 1,991,788 | Cartter | Feb. 19, 1935 |
| 2,163,928 | Andrews | June 27, 1939 |
| 2,277,201 | Belt | Mar. 24, 1942 |

FOREIGN PATENTS

| Number | Country | Date |
|---|---|---|
| 436,681 | Great Britain | Oct. 16, 1935 |
| 447,840 | Great Britain | May 27, 1936 |